(12) United States Patent
Lin

(10) Patent No.: US 12,008,107 B2
(45) Date of Patent: Jun. 11, 2024

(54) CHIP AND METHOD CAPABLE OF AUTHENTICATING OFF-CHIP DEBUG FIRMWARE PROGRAM AND DEBUG USER

(71) Applicant: NUVOTON TECHNOLOGY CORPORATION, Hsinchu (TW)

(72) Inventor: Zong-Min Lin, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 33 days.

(21) Appl. No.: 17/850,295

(22) Filed: Jun. 27, 2022

(65) Prior Publication Data

US 2023/0418946 A1 Dec. 28, 2023

(51) Int. Cl.
*G06F 21/57* (2013.01)
*G06F 21/31* (2013.01)

(52) U.S. Cl.
CPC ............ *G06F 21/572* (2013.01); *G06F 21/31* (2013.01); *G06F 21/575* (2013.01); *G06F 2221/033* (2013.01)

(58) Field of Classification Search
CPC ... G06F 21/37; G06F 21/572; G06F 2221/033
USPC .......................................................... 713/2
See application file for complete search history.

(56) References Cited

U.S. PATENT DOCUMENTS

| 9,430,347 | B2* | 8/2016 | Neve De Mevergnies ................. G01R 31/3177 |
| 9,886,580 | B2* | 2/2018 | Dasar ..................... G06F 9/4406 |
| 10,242,196 | B2* | 3/2019 | Gunti ..................... G06F 21/575 |
| 10,397,230 | B2* | 8/2019 | Callaghan ............. H04L 63/101 |
| 11,347,863 | B2* | 5/2022 | Lin ........................ G06F 21/575 |
| 11,663,101 | B2* | 5/2023 | Lin ...................... G06F 11/2733 714/28 |
| 2015/0331043 | A1* | 11/2015 | Sastry ................ G01R 31/3177 714/726 |
| 2019/0214102 | A1* | 7/2019 | Park .......................... H04L 9/14 |

* cited by examiner

*Primary Examiner* — Brian T Misiura
(74) *Attorney, Agent, or Firm* — Muncy, Geissler, Olds & Lowe, P.C.

(57) ABSTRACT

A chip capable of authenticating an off-chip debug firmware program and a debug user account is illustrated. The chip runs the secure boot firmware and executes the secure boot process to verify whether the debug firmware program in a signed program loaded from an external storage device may be executed. After the signed program is successfully verified, the chip runs the debug firmware program to execute a debug user authentication algorithm in the signed program, thereby starting a debug user authentication process. After verifying the debug user account of the external debugging tool connected to the chip is a valid debug user account, the debugging tool is allowed to use the debugging function in the chip according to the authority of the debug user.

10 Claims, 3 Drawing Sheets

CHIP AND METHOD CAPABLE OF
AUTHENTICATING OFF-CHIP DEBUG
FIRMWARE PROGRAM AND DEBUG USER

BACKGROUND OF THE DISCLOSURE

1. Field of the Disclosure

The present disclosure relates to a chip and a method capable of authenticating a debug user, and in particularly related to a chip and a method of authenticating an off-chip debug firmware program and a debug user of the debugging tool.

2. Description of the Related Art

In a chip having a microprocessor, since an executed software program or firmware program is usually complicated and thus requires larger storage capacity, the executed software program or firmware program is generally not stored in a chip but in storage devices outside the chip to store the required software programs or firmware programs. Therefore, the chip usually does not have a non-volatile memory unit with large capacity but a non-volatile memory unit with smaller capacity (less than a thousand bytes). The smaller capacity (less than one thousand bytes) of the non-volatile memory unit is used to store setting values related to the chip characteristic, and based on cost considerations or other factors, a few of small capacity (less than one thousand bytes) of the non-volatile memory unit is usually a one-time program non-volatile memory unit, for example, a read-only memory unit.

During the development process of the chip, especially while an engineer develops the underlying software program or firmware program, therefore, the engineer usually needs to use an external debug tool of the chip to debug the chip. Therefore, the chip must be equipped with at least one or more debugging functions, wherein the debugging functions are used to allow the external debug tools to access chip resources or control the processor of the chip. However, once the chip is in a development stage, the chip may have valuable assets. In order to protect these assets, the management authority of these debugging functions is very important.

SUMMARY OF THE DISCLOSURE

According to an aspect of the present disclosure, an embodiment of the present disclosure provides a chip and a method of authentication off-chip debug firmware program and debug user. The chip or method may execute a debug function management for chips that may not store debug software programs or debug firmware programs, so as to prevent unauthenticated or unauthorized external debug users from randomly accessing the chip and obtaining valuable assets in the chip through the debug tool.

According to the purpose of the present disclosure, an embodiment of the present disclosure provides a chip capable of authenticating an off-chip debug firmware program and a debug user. The chip comprises a non-volatile memory storing a secure boot firmware, a secure boot public key and a debugging function default value; a debugging function control component comprising at least one debugging function and a register configured to save at least one debugging function state value, wherein an initial value of the a debugging function state value stored by the register is the debugging function default value; a volatile memory; and at least one processor configured to execute the secure boot firmware for verifying a signed program loaded from an external storage device according to the secure boot public key and running a debug firmware program of the signed program after the signed program is successfully verified to verify whether the debug user of an external debugging tool connected to the chip is a valid debug user by using a debug user authentication algorithm in the signed program, wherein the debugging function is provided to be used by the valid debug user.

Optionally, the signed program further comprises a debug user account and an authority of the debugging function of the debug user account, thereby making the valid debug user use the debugging function according to the authority of the debug user.

Optionally, the chip further comprises a debug port, an external boot bus, a debug authentication bus, and a debug bus, wherein the debug port communicates with the debug tool through the debug bus, the debug authentication bus is a bus where the debug user of the debug tool authenticates the chip, and the external start bus is a bus where the chip communicates with the external storage device.

Optionally, the chip changes the debugging function state value by running the debug firmware program, thereby making the valid debug user use the debugging function Optionally, the debugging function is a function of the debugging tool accessing a memory space of a system, Optionally, the debugging function is a function of the debugging tool making the processor enters a debug state to suspend an operation.

Optionally, the debugging function is a function of the debugging tool recording a process of the processor running a program.

Optionally, the external storage device further stores a program sign, which is proofread by the processor through using the secure boot public key, thereby verifying the signed program.

Optionally, the debug user inputs an authentication request and the processor authenticates whether the debug user is the valid debug user according to a password or a key of the authentication request.

According to the purpose of the present disclosure, an embodiment of the present disclosure provides a method capable of authenticating an off-chip debug firmware program and a debug user, comprising running a secure boot firmware to verify a signed program loaded from an external storage device according to a secure boot public key, wherein a processor uses the secure boot public key to verify a program sign of the external storage device, thereby verifying the signed program; and running a debug firmware program of the signed program after the signed is successfully verified to verify whether a debug user of the external debugging tool connected to the chip is a valid debug user by using a debug user authentication algorithm in the signed program, wherein the processor verifies whether the debug user is the valid debug user according to a password or a key of the authentication request input by the debug user, and the debugging function is used by the valid debug user.

In light of the foregoing, the chip and method capable of authenticating an off-chip debug firmware program and a debug user of the embodiments of the present disclosure, and hence unauthenticated or unauthorized external debug users may be prevented from randomly accessing the chip and obtaining valuable assets in the chip through the debug tool.

In order to further understand the technology, means, and effects of the present disclosure, reference may be made by the detailed description and drawing as follows. Accordingly, the purposes, features and concepts of the present disclosure may be thoroughly and concretely understood. However, the following detailed description and drawings are only used to reference and illustrate some implementation of the present disclosure, and they are not used to limit the present disclosure.

BRIEF DESCRIPTION OF THE DRAWINGS

The accompanying drawings are provided to enable persons having ordinary skills in the art may further understand the present disclosure, and the accompanying drawings are incorporated in and constitute a part of the specification of the present disclosure. The drawings illustrate exemplary embodiments of the present disclosure, and the description in the specification of the present disclosure is served to explain together the principal of the present disclosure.

DESCRIPTION OF THE PREFERRED EMBODIMENTS

Figure 1:
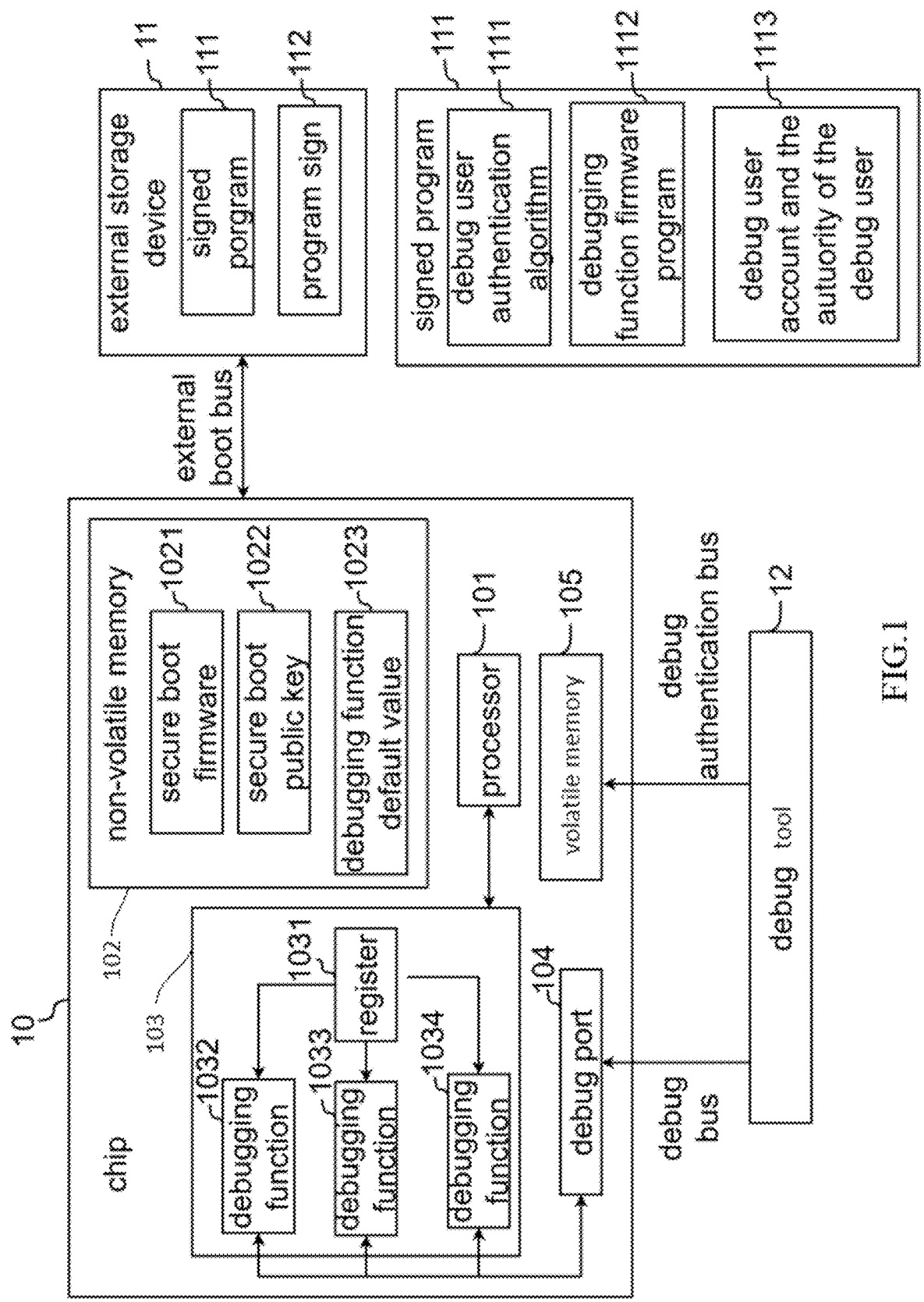
FIG. 1 is a system block diagram of a chip capable of authenticating an off-chip debug firmware program and a debug user according to an embodiment of the present disclosure.

To make the aspects, technical solutions and advantages of the present disclosure clearer, the technical solutions in the embodiments of the present disclosure will be described clearly and completely with reference to the accompanying drawings of the present disclosure. Obviously, the described embodiments are part of, but not all of, the embodiments of the present disclosure. Based on the embodiments of the present disclosure, all other embodiments obtained by those skilled in the art without creative work shall fall within the protection scope of the present disclosure. Unless otherwise defined, the technical or scientific terms used herein shall have the usual meanings understood by those skilled in the art related to the present disclosure. As used herein, "comprising" and other similar terms mean that the elements or objects appearing before the term encompass the elements or objects listed after the term and their equivalents, without excluding other elements or objects.

An embodiment of the present disclosure provides a chip and a method capable of authenticating an off-chip debug firmware program and a debug user, and the chip comprises at least one processor, a volatile memory, a non-volatile memory, a debug port, and a debugging function control component. The non-volatile memory may comprise a plurality of non-volatile memory units with small capacity (less than one thousand bytes) to respectively store a secure boot firmware, a secure boot public key, a debugging function default value. The debugging function control unit comprises at least one debugging function and a register, and the register store a debugging function state value.

When a debug tool connects to the chip through a debug bus and debug authentication bus, and the external storage device connects to the chip through the external boot bus, the secure boot firmware of the non-volatile memory will be executed by the processor to verify a signed program stored in an external storage device by the secure boot public key. The signed program has a debug user authentication algorithm, a debugging function firmware, and a debug user account and an authority of the debug user.

Moreover, the debug user of the debug tool may be authenticated whether the debug user is a valid debug user by the debug user authentication algorithm, and the debugging function control component will be set according to a type and an authority of the user of the debug tool through a debug user account and an authority of the debugging function of the user after the debug user of the debug tool is successfully verified, thereby making the debug tool control the debugging function control component in the chip according to the type and the authority of the debug user, and thereby executing the debugging function which is allowed to be controlled.

Simply speaking, the embodiment of the present disclosure provides a chip and a method capable of authenticating an off-chip debug firmware program and a debug user. The chip and the method are mainly used to authenticate the debugging function firmware program loaded from the external storage device and further verify whether the debug user of the debug tool is the valid debug user by debug user authentication algorithm after the debugging function firmware program of the external storage device is successfully verified. Furthermore, the chip may manage the authority and using frequency of a valid debug user using the debugging function control component, according to the debug user account and the authority of the debugging function of the debug user. Therefore, the chip and method capable of authenticating an off-chip debug firmware program and a debug user of the embodiment of the present disclosure may prevent the unauthenticated or unauthorized external debug tool from randomly accessing the chip and obtaining valuable assets in the chip.

After illustrating the inventive concept of the present disclosure, the embodiments of the present disclosure further illustrate the details of the chip and the method capable of authenticating an off-chip debug firmware program and a debug user. First, please referring to FIG. 1, FIG. 1 is a system block diagram of a chip capable of authenticating an off-chip debug firmware program and a debug user according to an embodiment of the present disclosure. The chip 10 comprises at least one processor 101, a non-volatile memory 102, a debugging function control component 103, a debug port 104, and a volatile memory 105. The debugging function control component 103 is electrically connected to the processor 101, the non-volatile memory 102, and the debug port 104. Additionally, the chip 10 further comprises an external boot bus, a debug bus, and a debug authentication bus. The external boot bus is used as a communication bus between the chip 10 and an external storage device 11. The debug bus is used as a communication bus between the debug port 104 of the chip 10 and a debug tool 12. The debug authentication bus is used as a communication bus of the chip 10 for verifying the debug tool 12.

The processor 101 is configured to execute program to control the chip 10. Further, the processor 101 may access a register 1031, a non-volatile memory 102, and volatile memory 105 of the debugging function control component 103, and the processor 101 may access the external storage device 11 through the established external boot bus. The processor 101 may load a signed program 111 into the external storage device 11 through the external boot bus, run a secure boot firmware 1021 saved in the non-volatile memory 102, and run a debugging function firmware program 1112 and a debug user authentication algorithm 1111 of the signed program 111.

Please note that the above is an example only, the chip 10 is not limited to having one processor 101 but also may have more than one processor 101. For example, the chip 10 may have two processors, and the work and function of these processors may be the same or different. Moreover, the external boot bus may be one of USB, SD card, eMMC, NAND Flash, SPI Flash, and other interfaces. It doesn't need to be addressed by the processor 101, but the processor 101 may access the data of the external storage device 11 through these interfaces.

The non-volatile memory 102 save a secure boot firmware 1021, a secure boot public key and a debugging function default value 1023. The secure boot firmware 1021 may be executed by the processor 101, so as to safely boot the chip 10. The secure boot public key 1022 is configured to verify the public key of the external debugging function firmware program when it is securely booted. The debugging function default value 1023 is the state default values of these debugging functions 1032~1034. In some embodiments of the disclosure, it may use at least one bit of the debugging function default value 1023 to code these state default value of these debugging functions 1032~1034. For example, "0" indicates a turn-on state of these debugging functions 1032~1034, and "1" indicates a turn-off state of these debugging functions 1032~1034. In other embodiments of the disclosure, it may also use default value using three bits of the debugging function to respectively code these state default values of the debugging function 1032~1034. A non-volatile memory unit of the non-volatile memory 102, configured to store one of the secure boot firmware 1021, the secure boot public key 1022 and the debugging function default value 1023, may be the one-time program non-volatile memory unit.

Incidentally, the secure boot is mainly used to verify the integrity and the authenticity of the signed program 111. The method of the secure boot use a pair of public and private key of a public key cryptography, and use the private key to encrypt the signed program 111 or a hash value of the signed program 111. RSA, ECDSA and EdDSA are some common encryption methods. Moreover, an owner of the secure boot public key 1022 may authenticate the program sign by the secure boot public key 1022 to verify whether the signed program 111 is provided by some owner. By using this mechanism, the chip 10 may be bound to the external signed program 111 and make the chip 10 only executes the authenticated valid signed program 111. When the processor 101 loads the signed program 111 from the external device 11 every time, the processor 101 verifies the external input signed program 111 by using the secure boot public key 1022, and only the correct and passed signed program 111 may be executed in the chip 10.

The volatile memory 105 is configured to store a data loaded from the external storage device 11. For example, the debugging function firmware program 1112, which passes the signed program 111 of the secure boot authentication. The volatile memory 105 may be addressed by the processor 101, and the processor 101 may execute the debugging function firmware 1112 stored in the volatile memory 105. Moreover, the external debug authentication bus is a bus of the debug tool 12 communicating with the debugging function firmware program of the chip 10, and the external debug authentication may be used as one of UART, SWD, SPI or USB interfaces. The debug port 104 provides a debug bus for the debug tool 12 of the authenticated valid debug user accessing these debugging functions 1032~1034 of the chip 10. The debug bus may use one of JTAG or SWD interfaces, and the debug bus may be one or one more entity entrances.

Additionally, the external debug authentication bus and a debug bus, which the debug port 104 uses, may be the same communication bus. That is, the external debug authentication bus and the debug bus use the same communication bus.

The debugging function control component 103 comprises a register 1031 and a plurality of debugging functions 1032~1034. Whether the debugging functions 1032~1034 may be accessed and controlled by the debugging function control component 103. Furthermore, whether the debugging function control component 103, configured to control the debugging functions 1032~1034, may be accessed by the external debug tool 12. The debugging functions 1032~1034 are the functions needed to be used when the debug tool 12 debugs the chip 10. For example, these functions may be but not be limited to (1) accessing the system memory space by the debug tool 12; (2) the process of the debug tool 12 making the processor 101 enter a debug state to halt the processor 101 when it enters the debug state and recording the process of the processor 101 executing program by the debug tool 12 (i.e. tracing code).

The debugging function control component 103 provides an interface for the processor 101 accessing the debugging functions 1032~1034 to achieve the purpose of software and hardware coordination. The executing debugging function firmware program 1112 may access a register of the debugging function control component 103 through that interface to make each of the debugging functions 1032~1034 change to the turn-on state from the default turn-off state or make each of the debugging functions 1032~1034 change to the turn-off state from the default turn-on state. The register 1031 is a hardware device, and the debugging function state comprises but not be limited to two states: the turn-off state and the turn-on state. That is, the debugging state value is not necessarily a binary value of "0" and "1".

When the debugging function control component 103 sets the debugging function 1032 in the turn-on state, then the debugging function 1032 is in the turn-on state, and the debug tool 12 may accesses the debugging function 1032 of the chip 10. When the debugging function control component 103 sets the debugging function 1034 in the turn-off state, then the debugging function 1034 is in the turn-off state, and the debug tool 12 may not accesses the debugging function 1032 of the chip 10, but the debugging function firmware program 1112 may change the debugging functions 1032~1034 from the turn-off state to the turn-on state by setting the debugging function state value stored in the register 1031. The default state of the debugging functions 1032~1034 set in the turn-on state or the turn-off state is according to the debugging function default value stored in the non-volatile memory 102. When the debugging function state of the debugging functions 1032~1034 are in the turn-on state, the debugging functions 1032~1034 are open to be accessed by the debug tool 12 without through the authentication process. But, in general, the debugging function default state of the debugging functions 1032~1034 is in the turn-off stat. Whether the debugging functions 1032~1034 may be changed to the turn-on state is decided by the debug user account of the debug tool 12 and the authority of the debug user.

The external storage device 11 stores the program of authenticating the debug user of the debug tool 12 and the data, and at least comprises a signed program 111 and a program sign 112. The signed program 111 comprises a debugging function firmware program 1112, a debug user authentication algorithm 1111, a debug user account, and a authority of the debug user 1113. The debugging function firmware program 1112 comprises a function of accessing the chip 10 by the debugging function control component 103 and a function of establishing the debug authentication bus for accepting an input order of the debug tool 12. The program sign 112 uses a digital sign created by the public private cryptography. Moreover, the program sign 112 is the digital sign created by using the matched private key of the secure boot public key 1022 according to the debugging function firmware program 1112. In one of the embodiments, the program sign 112 is the digital sign which is created by using the private key to encrypt the debugging function firmware 1112 or a hash value of the debugging function firmware program 1112.

The debug user authentication algorithm 1111 verifies whether the user of the debug tool 12 is a valid debug user based on the authentication method of cryptology, for example, using a password comparison method or a public key authentication method, and the invention is not limited thereto. When the authentication is fail, the chip 10 will not make the debug tool 12 operate the debugging function control component 103. When the authentication is successful, the chip 10 sets the debugging function control component 103 by the debugging function firmware program which is based on the user account and the authority of the user of the debug tool 12, so as to make the debug user operate the authority of the user, and the authority is the allowed debugging functions 1032~1034. Furthermore, the debug user and the authority of the user of the debugging function may record the type of the debug user and the authority of the user of the debug tool 12. That is, it may record the debug user and the authority of every debug user allowed to operate debugging functions 1032~1034 of the different user password.

When the processor 101 of the chip 10 executes the secure boot firmware 1021, the processor 101 loads the signed program 111 and program sign 112 into the volatile memory 105 from the external storage device 11. In the process of executing the secure boot, in order to ensure the safety of the secure boot process, the debugging function of the debug tool 12 accessing the memory space will be forced to set in the turn-off state. The debugging function of the debug tool 12 making the processor 12, which executes the secure boot, enter the debug state will be forced to set in the turn-off state, and the function of the debug tool 12 recording the process of the processor 101 executing the secure boot running the program will be forced to set in the turn-off state. Furthermore, after the processor 101 successfully completes the secure boot and ends the secure boot, the debugging function, which is forced to set in the turn-off state, will not be forced to set in the turn-off mode, and the debugging function will be the turn-on mode or the turn-off mode according to the debugging function.

Figure 2:
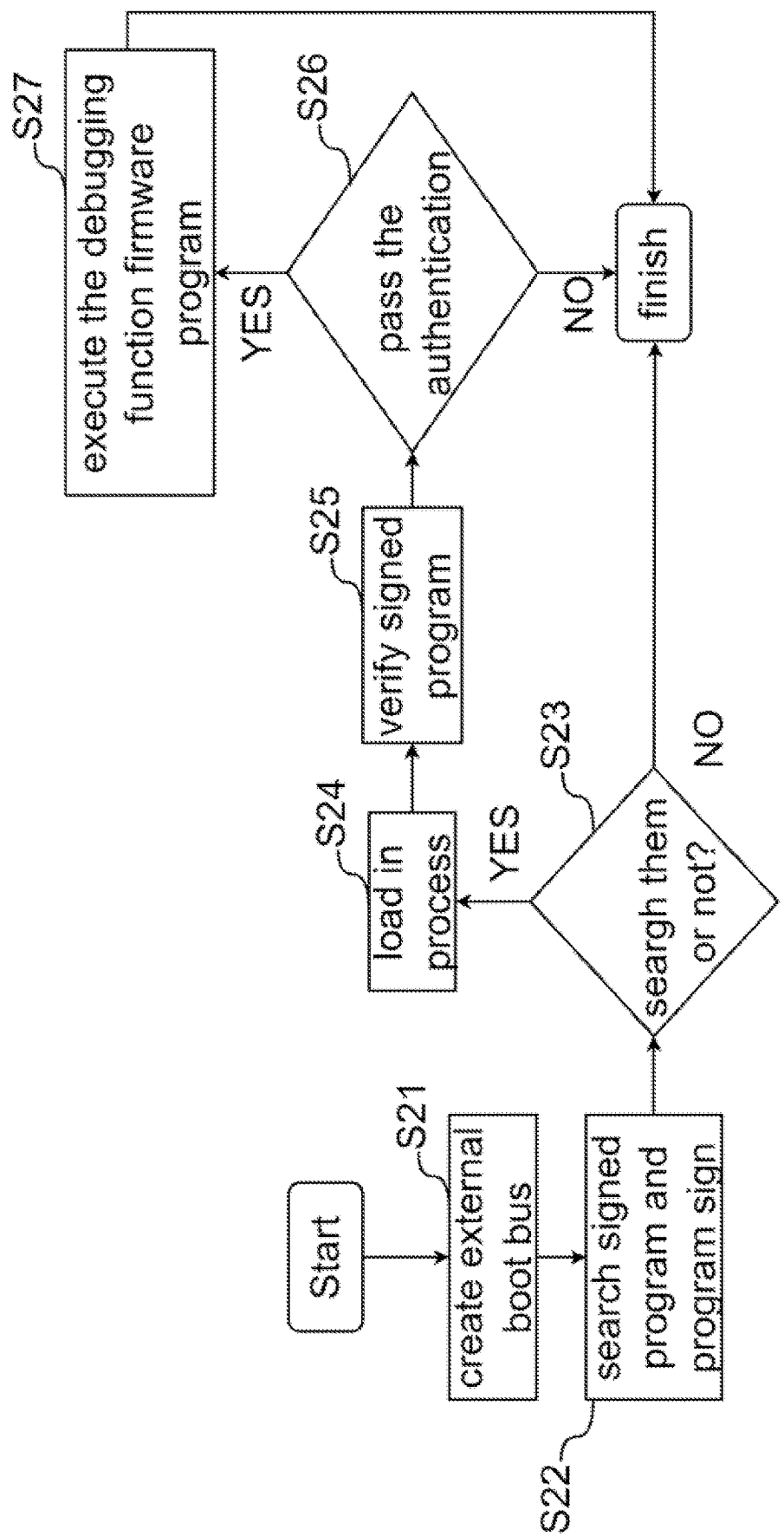
FIG. 2 is a flow chart of a chip executing a secure boot according to an embodiment of the present disclosure.

Next, please referring to FIG. 1 and FIG. 2, FIG. 2 is the flow chart of the chip executing the secure boot according to an embodiment of the present disclosure, and the detail flow of the secure boot is disclosed in the following. First, in step S21, the corresponding interface is used to create an external boot bus. Then, in step S22, whether the external storage device 11 stores the signed program 111 and the program sign is searched. In step S23, whether there exists the signed program 111 and the program sign 112 in the external storage device 11 is found is determined. If there exists the signed program 111 and the program sign 112 in the external storage device 11, then go to step S24, otherwise, the secure boot flow is finished. In step S24, the signed program 111 and the program sign 112 from the external storage device 11 to the chip 10 is loaded. Next, in step S25, the secure boot public key 1022 is used to verify the signed program 111. In step S26, whether the signed program 111 and the program sign 112 pass the authentication is determined. If the signed program 111 and the program sign 112 pass the authentication, then go to step S27, otherwise, the secure boot flow is finished. In step S27, the chip 10 executes the debugging function firmware program 1112 of the signed program 111.

Figure 3:
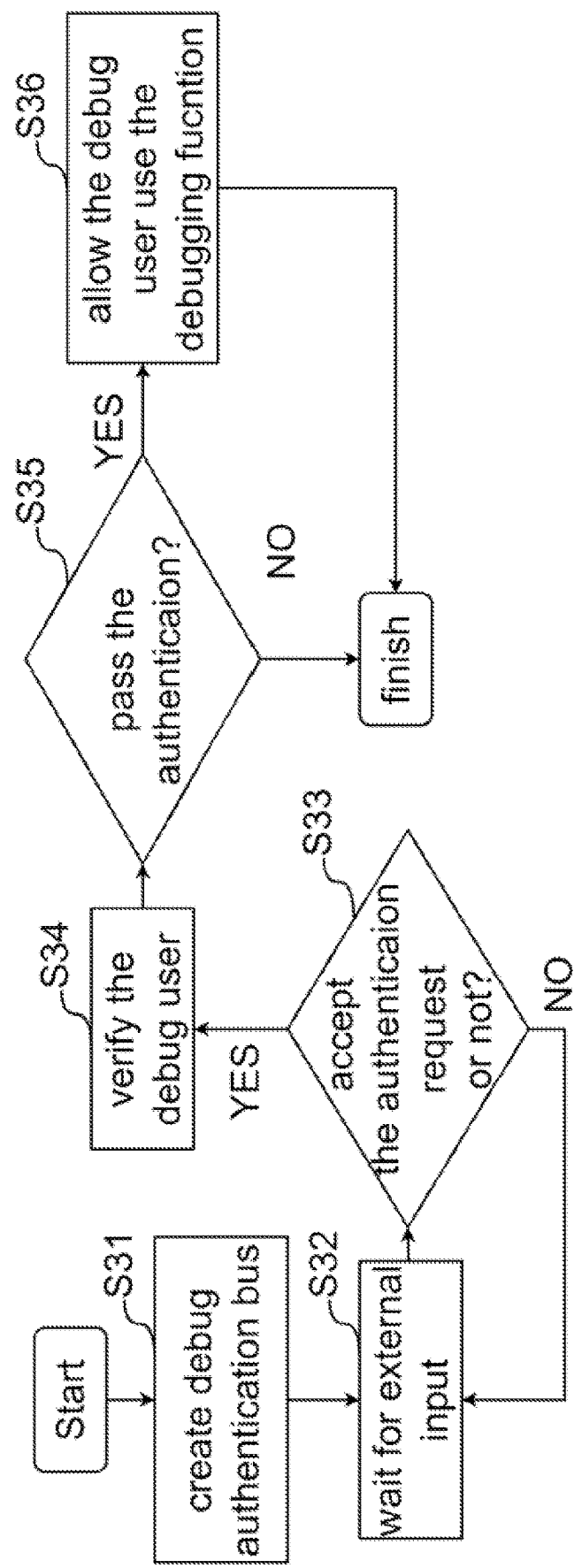
FIG. 3 is a flow chart of a chip authenticating a debug user of a debug tool according to an embodiment of the present disclosure.

After the secure boot flow is over, the user starts the debug user authentication flow by the chip 10 executing the debugging function firmware program 1112, and the debug user authentication flow is configured to make the chip 10 authenticate whether the debug user, who means to debug, is a valid debug user. Please referring to FIG. 1 and FIG. 3, FIG. 3 is the flow chart of the chip authenticating the external debugging function firmware program and debug tool according to an embodiment of the present disclosure. In step S31, the corresponding interface is used to create a debug authentication bus. Then, in step S32, an external input is waited. In step S33, whether there is an authentication request from the external input, such as inputting a password or key of the debug user, is determined. If there is the authentication request from the external input, then go to step S34, otherwise, go to step S32. In step S35, the debug user authentication algorithm is executed to determine whether the debug user of the debug tool 12 is a valid debug user according to the authentication request of the external input. If the debug user is verified as a valid debug user, then go to step S36, otherwise, the debug user authentication flow is over, and an authentication error is reported. In step S36, the type and the authority of the debug user is determined according to the debug account and the debugging function authority of the debug user to turn on the debugging functions 1032~1034 of the debugging function control component 103.

Next, please refer to FIG. 1. In one of the implement methods, the at least one processor 101 above may be replaced by two processors. The two processors are respectively as Cortex-A35 processor and Cortex-M4 processor of ARM architecture. The Cortex-A35 processor is used as the core processor of the chip 10, and Cortex-M4 processor doesn't intervene in the debug authentication function. The volatile memory 102 may be one-time program read-only memory. The SWD interface is used as the debug bus. The UART interface is used as the debug authentication bus. The debugging function 1032~1034 respectively control MEM-AP hardware used by the external debugger (MEM-AP is a common device in the ARM architecture configured to make the debugger 12 access the memory space of the chip 10), the ability of controlling the debugger 12 to make Cortex-A35 processor enter in a debug state and the ability of controlling the debugger 12 to make Cortex-M4 processor enter in a debug state. The external storage device 11 may be a Flash memory, and the volatile memory may be SRAM.

In this embodiment, the debug user is defined as one, and the valid debug user may use these three debugging functions 1032 to 1034. When it starts executing, Cortex-A35 processor executes the secure boot firmware 1021 loaded from the non-volatile memory 102, so as to implement the above secure boot flow. The signed program 111 and the program sign 112 are stored in the external storage device 11 outside the chip 10. The external storage device 11 communicates with the chip 10 using the SPI protocol. Cortex-A35 processor in the chip 10 reads in the signed program 111 and the program sign 112 from the external storage device 11 through the SPI interface, and then put them in the volatile memory 105, and execute the authentication process of the secure boot flow.

After the secure boot flow verifies the signed program 111, Cortex-A35 processor will load in and execute the debugging function firmware program 1112 of the signed program 111. After the debugging function firmware program 1112 is executed, Cortex-A35 processor executes the debug user authentication flow above. In this embodiment, the debug authentication function default is as one. Therefore, before the debug user of the debugger 12 is verified, the debug user cannot use any debugging function. The debugging function firmware program 1112 uses the UART communication protocol to communicate with the debugger 12, therefore, the debug user may use the UART protocol to send an authentication request and enter a password for comparison. Once the comparison is correct, the debug function firmware program 1112 will turn on these three debugging functions to make the debugger 12 accesses.

In summary, comparing to the prior art, a chip and method of authentication an off-chip debug firmware program and a debug user in the embodiments of the present disclosure prevents unauthenticated debug firmware from being executed on the chip by the secure boot flow, and uses the flow of authenticating the debug user to prevent the external unauthenticated and authorized debug tool randomly accesses the chip and obtains valuable assets in the chip. Furthermore, the chip and the method of the embodiment of the present disclosure manages the valid debug user using the authority and frequency of the debug function control component.

The present disclosure disclosed herein has been described by means of specific embodiments. However, numerous modifications, variations and enhancements may be made thereto by those skilled in the art without departing from the spirit and scope of the disclosure set forth in the claims.

What is claimed is:

1. A chip capable of authenticating an off-chip debug firmware program and a debug user, comprising:
    a non-volatile memory storing a secure boot firmware, a secure boot public key and a debugging function default value;
    a debugging function control component comprising at least one debugging function and a register configured to store at least one debugging function state value, wherein an initial value of the debugging function state value stored by the register is the debugging function default value;
    a volatile memory; and
    an at least one processor configured to run the secure boot firmware for verifying a signed program loaded from an external storage device according to the secure boot public key and run a debug firmware program of the signed program after the signed program is successfully verified to verify whether the debug user of an external debugging tool connected to the chip is a valid debug user by a debug user authentication algorithm of the signed program, wherein the debugging function is provided to be used by the valid debug user.

2. The chip according to claim 1, wherein the signed program further comprises a debug user account and an authority of the debugging function of the debug user account, thereby making the valid debug user use the debugging function according to the authority of the debug user.

3. The chip according to claim 1, further comprising:
    a debug port, an external boot bus, a debug authentication bus, and a debug bus, wherein the debug port communicates with the debug tool through the debug bus, the debug authentication bus is a bus where the debug user of the debug tool authenticates the chip, and the external boot bus is a bus where the chip communicates with the external storage device.

4. The chip according to claim 1, wherein the chip changes the debugging function state value by running the debug firmware program, thereby making the valid debug user use the debugging function.

5. The chip according to claim 1, wherein the debugging function is a function of the debugging tool accessing a memory capacity of a system.

6. The chip according to claim 1, wherein the debugging function is a function of the debugging tool making the processor enter a debug state to suspend an operation.

7. The chip according to claim 1, wherein the debugging function is a function of the debugging tool recording a process of the processor running a program.

8. The chip according to claim 1, wherein the external storage device further stores a program sign, which is proofread by the processor through using the secure boot public key, thereby verifying the signed program.

9. The chip according to claim 1, wherein the debug user inputs an authentication request and the processor authenticates whether the debug user is the valid debug user according to a password or a key of the authentication request.

10. A method capable of authenticating an off-chip debug firmware program and a debug user, comprising:
    running a secure boot firmware to verify a signed program loaded from an external storage device according to a secure boot public key, wherein a processor uses the secure boot public key to verify a program sign of the external storage device, thereby verifying the signed program; and
    after the signed program is successfully verified, running a debug firmware program of the signed program to verify whether a debug user of an external debugging tool connected to a chip is a valid debug user by using a debug user authentication algorithm in the signed program, wherein the processor verifies whether the debug user is the valid debug user according to a password or a key of an authentication request input by the debug user, and the debugging function is provided to be used by the valid debug user.

* * * * *